US011751010B2

(12) United States Patent
Agosti et al.

(10) Patent No.: US 11,751,010 B2
(45) Date of Patent: Sep. 5, 2023

(54) CREATING A COMMUNICATION CHANNEL BETWEEN USER DEVICES AND LOCAL STORES

(71) Applicant: Google LLC, Mountain View, CA (US)

(72) Inventors: Matteo Agosti, Bellinzona TI (CH); Ankit Gupta, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/069,652

(22) Filed: Dec. 21, 2022

(65) Prior Publication Data
US 2023/0130669 A1     Apr. 27, 2023

Related U.S. Application Data

(63) Continuation of application No. 17/497,311, filed on Oct. 8, 2021, now Pat. No. 11,564,059, which is a continuation of application No. 16/500,237, filed as application No. PCT/US2018/045542 on Aug. 7, 2018, now Pat. No. 11,172,326.

(51) Int. Cl.
*H04W 4/02*     (2018.01)
*H04W 4/029*     (2018.01)
*H04W 76/10*     (2018.01)

(52) U.S. Cl.
CPC .......... *H04W 4/023* (2013.01); *H04W 4/029* (2018.02); *H04W 76/10* (2018.02)

(58) Field of Classification Search
CPC ........ H04L 51/52; H04W 4/02; H04W 4/029; H04W 4/021; H04W 4/025; H04W 12/02; H04W 4/023; H04W 76/10
See application file for complete search history.

(56) References Cited

U.S. PATENT DOCUMENTS

| 9,047,631 | B2 | 6/2015 | Sridharan et al. |
| 10,334,392 | B2 * | 6/2019 | Mohamed ............. H04W 28/08 |
| 2009/0287534 | A1* | 11/2009 | Guo ....................... G06Q 30/02 |
| | | | 705/7.34 |
| 2012/0020473 | A1* | 1/2012 | Mart ..................... H04L 51/214 |
| | | | 379/265.09 |

(Continued)

FOREIGN PATENT DOCUMENTS

| CN | 102945239 A | 2/2013 |
| CN | 107430673 A | 12/2017 |
| WO | 2016109460 A1 | 7/2016 |

OTHER PUBLICATIONS

International Search Report and Written Opinion for International Application No. PCT/US2018/045542 dated May 2, 2019. 15 pages.

(Continued)

*Primary Examiner* — Dung Hong
(74) *Attorney, Agent, or Firm* — Lerner David LLP

(57) ABSTRACT

A user-to-entity communication channel is established for providing increased information regarding entities to the general population. Ambassadors for a entity are identified and selected based on location history of devices for which location reporting is authorized. The ambassadors may provide information regarding the entity to the public through the communication channel. Communications between the users and ambassadors may be reported to the entity owner for analysis by the entity owner.

20 Claims, 7 Drawing Sheets

(56) References Cited

U.S. PATENT DOCUMENTS

| | | | | |
|---|---|---|---|---|
| 2012/0158597 | A1* | 6/2012 | Malik | G06Q 30/016 |
| | | | | 705/304 |
| 2013/0198039 | A1* | 8/2013 | Sridharan | G06Q 30/0613 |
| | | | | 705/26.44 |
| 2013/0263008 | A1* | 10/2013 | Bylahalli | G06Q 10/103 |
| | | | | 715/739 |
| 2015/0025929 | A1* | 1/2015 | Abboud | G06Q 30/0613 |
| | | | | 705/7.15 |
| 2016/0104122 | A1* | 4/2016 | Mande | H04W 4/029 |
| | | | | 705/7.19 |
| 2016/0189164 | A1* | 6/2016 | Tolksdorf | G06Q 30/016 |
| | | | | 705/304 |
| 2016/0191712 | A1* | 6/2016 | Bouzid | H04M 3/5232 |
| | | | | 379/265.12 |
| 2016/0275470 | A1* | 9/2016 | Straw | G06Q 20/3224 |
| 2016/0277869 | A1* | 9/2016 | Mulayev | H04W 4/60 |
| 2017/0011449 | A1* | 1/2017 | Mueller | G06Q 30/0635 |
| 2017/0053227 | A1* | 2/2017 | Robinson | H04W 4/38 |
| 2017/0124511 | A1* | 5/2017 | Mueller | H04W 4/029 |
| 2017/0238153 | A1* | 8/2017 | Daoud | H04W 4/029 |
| | | | | 455/466 |

OTHER PUBLICATIONS

International Preliminary Report on Patentability for International Application No. PCT/US2018/045542 dated Feb. 18, 2021. 10 pages.
Office Action for Chinese Patent Application No. 201880094204.2 dated Sep. 5, 2022. 6 pages.

* cited by examiner

CREATING A COMMUNICATION CHANNEL BETWEEN USER DEVICES AND LOCAL STORES

CROSS-REFERENCE TO RELATED APPLICATIONS

The present application is a continuation of U.S. patent application Ser. No. 17/497,311, filed on Oct. 8, 2021, which is a continuation of U.S. patent application Ser. No. 16/500,237, filed on Oct. 2, 2019, which application is a national phase entry under 35 U.S.C. § 371 of International Application No. PCT/US2018/045542, filed Aug. 7, 2018, all of which are hereby incorporated herein by reference.

BACKGROUND

If a person is looking for a product or local service, they typically start by looking for it online, such as by entering a search in a search engine. However, some local stores or other entities do not have websites, or their websites may not contain the information being sought by the person. Currently, the person would need to identify an entity potentially providing the product or service, find contact information for the entity, call the entity, and hope someone is available at the entity to answer the person's question. In many instances, the person would need to repeat the entire process for a second entity, such as if the first entity did not have what the person sought, or if the person wanted to compare products or services available at multiple entities. This is time consuming and inconvenient.

BRIEF SUMMARY

The present disclosure can provide a user-to-entity communication channel for providing increased information regarding entities to the general population. Ambassadors for an entity can be identified and selected based on location history of devices for which location reporting is authorized. The ambassadors may provide information regarding the entity to the public through the communication channel, thereby providing prompt responses to user requests, such as responses which may not be otherwise available through searching or other means. For example, the ambassadors may provide information for entities that do not have a website.

One aspect of the disclosure provides a method for establishing communication between entities and individuals, the method comprising receiving, with one or more processors, location information from a plurality of mobile computing devices, wherein each of the mobile computing devices have been set to authorize reporting of the location information, identifying, with the one or more processors based on the received location information, one or more individuals corresponding to a particular entity, selecting the one or more individuals to serve as an ambassador for the particular entity, the ambassador being authorized by an owner of the particular entity to communicate information regarding the entity, and establishing a communication channel between the ambassador and a plurality of users, wherein the ambassador provides information regarding the particular entity to one or more of the plurality of users through the communication channel.

In some examples, the method may further include verifying the ambassador, the verifying including obtaining confirmation from an owner of the particular entity. Further, requests received from the plurality of users through the communication channel may be filtered, such as by keyword filtering, and the filtered requests may be directed only to verified ambassadors. In some examples, the information provided by the ambassador devices over the communication channel may be automatically detected by the ambassador devices.

Identifying the one or more individuals may include determining at least one of which devices spend a predetermined amount of time at a location corresponding to the particular entity, or which devices visited the location corresponding to the particular entity a predetermined number of times. The ambassadors may be non-employees of the particular entity. An owner of the particular entity may have access to the communication channel, and may be able to correct information provided over the communication channel before or after such information reaches the user. A report may be generated based on information sent over the communication channel, the report providing an indication as to requests received through the communication channel, responses provided by the ambassador, and whether the responses resulted in a visit to the particular entity.

Another aspect of the disclosure provides a system for establishing communication between entities and individuals. The system includes at least one memory and one or more processors in communication with the at least one memory. The one or more processors are configured to receive location information from a plurality of mobile computing devices, wherein each of the mobile computing devices have been set to authorize reporting of the location information, identify, based on the received location information, one or more individuals corresponding to a particular entity, select one or more of the identified individuals to serve as an ambassador for the particular entity, the ambassador being authorized by an owner of the particular entity to communicate information regarding the entity, establish a communication channel between the ambassador and a plurality of users, wherein the ambassador provides information regarding the particular entity to one or more of the plurality of users through the communication channel.

Yet another aspect of the disclosure provides a non-transitory computer-readable medium storing instructions executable by one or more processors to perform a method for establishing communication between entities and individuals. Such method may include receiving location information from a plurality of mobile computing devices, wherein each of the mobile computing devices have been set to authorize reporting of the location information, identifying, based on the received location information, one or more individuals corresponding to a particular entity, selecting the one or more individuals to serve as an ambassador for the particular entity, the ambassador being authorized by an owner of the particular entity to communicate information regarding the entity, and establishing a communication channel between the ambassador and a plurality of users, wherein the ambassador provides information regarding the particular entity to one or more of the plurality of users through the communication channel.

A yet further aspect of the disclosure provides a computer-implemented method for communicating information about an entity, the method comprising: receiving a request for information relating to the entity from a client device; receiving location information from a plurality of mobile communication devices, wherein each of the mobile computing devices have been set to authorize reporting of location information; identifying, based on the received location information, one or more mobile communication devices in proximity to the entity; and establishing a communication channel between the client device and at least one of the identified one or more mobile communication devices, such at least one of the identified one or more mobile communication devices may transmit the information to the client device.

DETAILED DESCRIPTION

Overview

Figure 1:
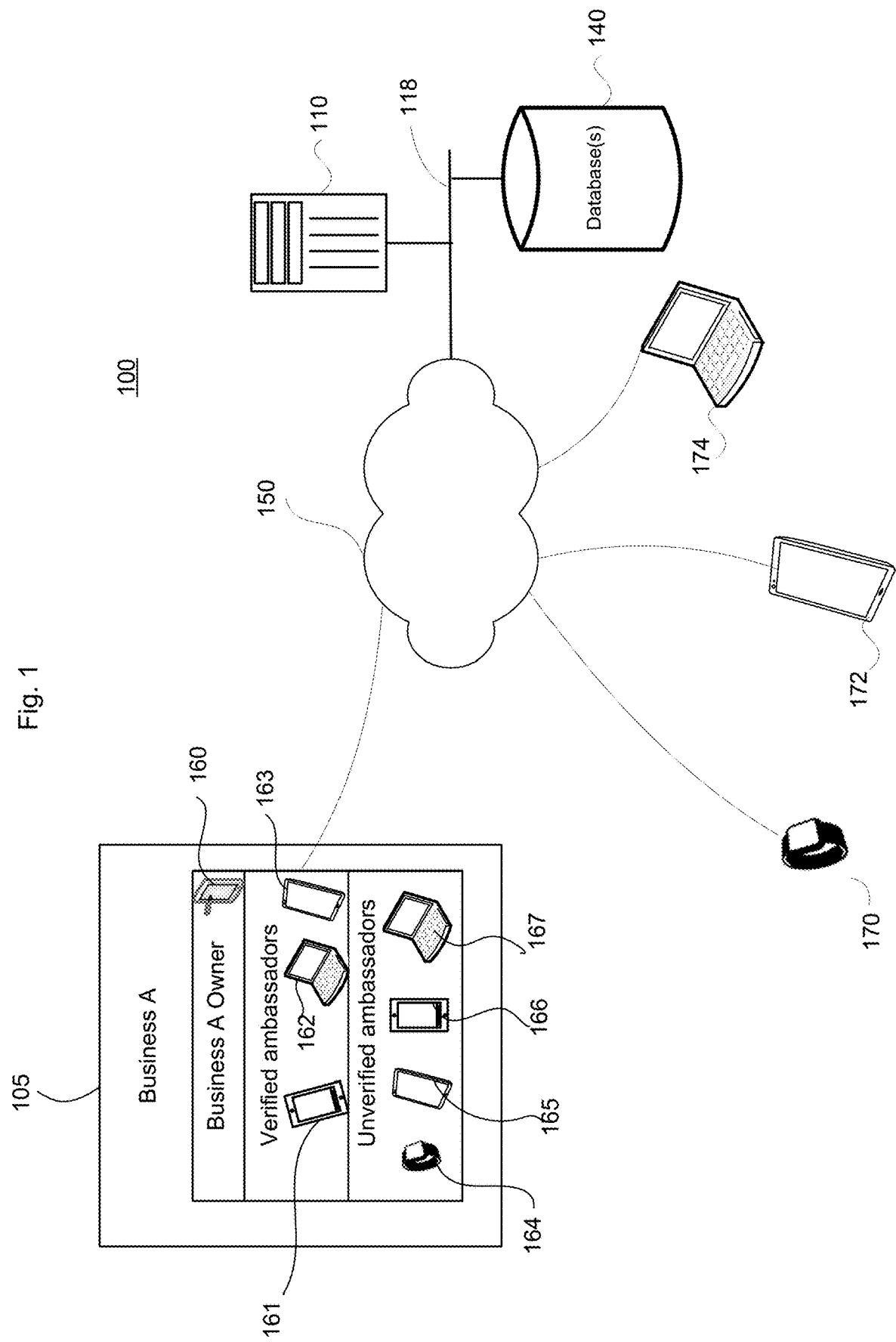
FIG. 1 is a pictorial diagram of an example system according to aspects of the disclosure.

The present disclosure relates generally to providing increased information regarding entities to the general population. These entities may for example be businesses, and in particular may be entities associated with a geographical location. Ambassadors for an entity are identified and selected based on location history. The ambassadors may provide information regarding the entity to the public, for example, through a user-to-entity communication channel. Communications between the users and ambassadors may be reported for analysis by the entity owner.

The ambassadors may be identified through analysis of location history reports. For example, users of mobile devices may authorize location reporting. For a particular entity, users that have reported locations that correspond to the particular entity may be identified. For example, the reported locations may indicate that a particular user spends a predetermined about of time per day, week, month, etc. at the entity location, or that the user has visited the entity location a predetermined number of times within a time period. In this regard, individuals that are not necessarily employees of the entity may be identified, thus expanding the pool of potential information sources. Additionally or alternatively, the current location of a potential ambassador may be assessed in light of the location report from a mobile device. Such information may be useful in determining the current conditions at the entity location, such as current network or environmental (e.g. temperature, light etc.) conditions.

Ambassadors may be verified or unverified. Verified ambassadors may include, for example, users having an affinity with the entity, such as users that have been approved by the entity owner as having particular status or authority. Such verified ambassadors may have a higher level of authority, as compared to unverified ambassadors, to perform articulated tasks that will not require extra verification by the entity owner. For example, the verified ambassadors may respond to questions regarding product availability. Unverified ambassadors may include, for example, users with knowledge regarding the entity but a lower level of affinity than the verified ambassadors. The unverified ambassadors may be authorized to perform some types of tasks, but not others. For example, the unverified ambassadors may be authorized to respond to questions regarding hours of operation of the entity, but not product availability. Some or all of the actions of the unverified ambassador may require review by the entity owner or by the verified ambassador, where such review may be performed individually for each request or in bulk.

Some requests may be filtered to the verified ambassadors, while other requests are sent to both verified and unverified ambassadors or only to unverified ambassadors. By way of example only, a user calling to get a product reserved for later pickup may be filtered to one or more verified ambassadors, while a request regarding what, time a entity opens may be sent, to everyone. Such filtering may be performed based on, for example, keywords, identifiers embedded in the requests (e.g., selection of a category by the user submitting the request determines where the request, is sent), or by any of a variety of other criteria.

An individual entity may have any number of ambassadors, where the ambassadors are verified, unverified, or some combination thereof. In some examples, requests may be sent to all ambassadors, and only ambassadors with appropriate authority can respond. In other examples, requests may be sent to only one or some of the verified or unverified ambassadors, and may be sent to additional ambassadors if a response is not received within a predetermined amount of time. In some examples, ambassadors may be compensated for their efforts in providing information to the public.

Users may communicate with the ambassadors through any of a variety of communication channels. For example, a dedicated chat channel may be provided through an application, such as a maps application, a shopping application, a search application, etc. Requests received through the communication channel may include any of a variety of types of requests, such as questions seeking information about the particular entity or items available at the particular entity, requests to hold a particular item in stock at the particular entity, requests to reserve a table if the entity is a restaurant, etc.

In some examples, the information provided by the ambassadors may be automatically provided by the ambassadors' devices. For example, a request received through the communication channel may ask about availability of wireless network access at a particular location. Devices of ambassadors that are currently or were previously at the location may, in response, report signal strength of available wireless networks at the particular location. Such automated responses may be provided for any information detectable by devices of the ambassadors, such as weather, connectivity, noise levels, busyness levels, lighting, etc.

In some examples, the communication channel may be accessed by a search engine. For example, if a user asks an ambassador whether a particular product is in stock at a particular entity, the search engine may use the answer to provide such information in response to future search requests. Business owners may also access the communication channel for their particular entity, for example, to oversee and correct the information being provided about the entity. The entity owner may always have visibility into the activity of an ambassador, some of which might lead to contributions: to static content that can be edited a-posteriori by the owner. For example, if an ambassador provides inventory data by taking photos of products at the store, that data may flow to an inventory management tool that the entity owner can use to both review and edit the data. For other types of ambassador contributions, such as question and answer types contributions, the entity owner may review the answers individually or in bulk, either prior to or after transmission to the requesting user. The entity owner may provide guidance to the ambassadors regarding how to respond to requests.

In some examples, reports of the communications between users and ambassadors may also be provided to entity owners. The entity owner may use this information to better understand the type of offline support to implement. For example, if users are frequently asking the hours of operation for the entity, the entity owner may make this information available on its website. The reports may further indicate to the entity owner how the ambassador activity translated to traffic at the entity, such as customers at the physical location of the entity, online purchases, etc.

By identifying entity ambassadors and setting up a communication channel, users may be able to readily receive answers to questions without a significant amount of searching. Moreover, entities can improve the services provided to customers by improving the sharing of information. Even entities without websites may provide current, accurate information to the users through the ambassadors.

Example Systems

FIG. 1 illustrates an example system 100 including computing devices for performing aspects of the present disclosure. The system 100 includes various client computing devices 160-167, 170-174 communicatively coupled to a server computing device 110 through a network 150. Client computing devices 160-167 may be associated with a particular entity 105. For example, client device 160 may be associated with an owner of the entity 105, while devices 161-167 are selected to serve as ambassadors for the entity 105, as described in further detail herein. Client devices 170-174 in this example represent users of the general public. Requests, such as questions, reservations, etc. regarding the entity 105, may be received at the client devices 160-167 from client devices 170-174 through the network 150. In this regard, one of more of the client devices 160-167 associated with the entity 105 may receive the requests and provide responses to the client devices 170-174 through the network 150.

The client computing devices 160-167, 170-174 may include any of a variety of types of devices capable of communicating over a network. By way of example and not limitation, such devices may include smart phones, cameras with wireless network access, laptops, smartwatches, tablets, head-mounted displays, gaming systems, etc. Each client computing device may include, for example, user input devices such as cameras, microphones, joysticks, buttons, touch screens, etc., as well as a display, which could include, for instance, an LED, LCD, plasma screen, projector, etc.

The server computing device 110 may actually include a plurality of processing devices in communication with one another. The server computing device 110 is described in further detail in connection with FIG. 2 below.

Databases 140 may be accessible by the server 110 and client computing devices 160-167, 170-174. The databases 140 may include, for example, information associated with entities, such as the entity 105. Such information may include, for example, map information, inventory information, imagery, etc. The imagery may in some instances be stored with metadata providing information regarding the images. Such metadata may include, for example, date and time of capture, location, camera settings, labels or tags corresponding to objects within the images, etc.

The network 150 may be, for example, a LAN, WAN, the Internet, etc. The connections between devices and the network may be wired or wireless.

Figure 2:
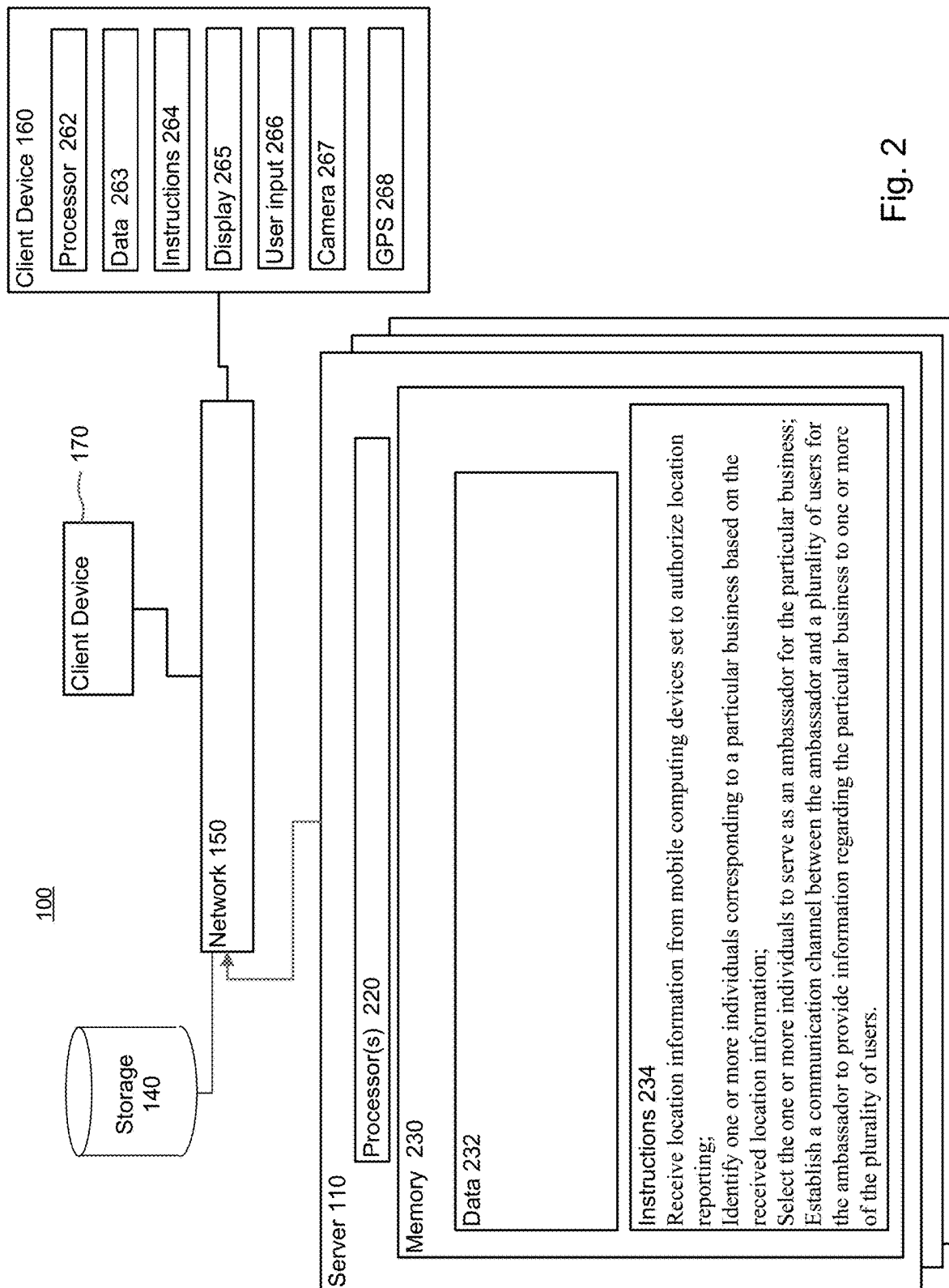
FIG. 2 is a block diagram illustrating further details of components of the example system of FIG. 1.

FIG. 2 illustrates further details of components in the example system 100. It should not be considered as limiting the scope of the disclosure or usefulness of the features described herein. Each of the server computing devices 110 can contain one or more processors 220, memory 230 and other components typically present in general purpose computing devices. Memory 230 of each computing device 110 can store information accessible by the one or more processors 220, including instructions 234 that can be executed by the one or more processors 220.

Memory 230 can also include data 232 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 232 may be retrieved, stored or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 220 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as image matching, image editing, object recognition, or performing other processes faster or more efficiently.

Although FIG. 2 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 160, 170 can be at different nodes of a network 150 and capable of directly and indirectly communicating with other nodes of network 150. Although only a few computing devices are depicted in FIG. 2, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 140 as well as computing devices 160, 170 via the network 150. For example, one or more of server computing devices 110 may use network 150 to transmit and present information to a user on a display, such as display 265 of computing device 160. In this regard, computing devices 160, 170 may be considered client computing devices and may perform all or some of the features described herein.

Each of the client computing devices 160, 170 may be configured similarly to the server computing devices 110, with one or more processors, memory and instructions as described above. Each client computing device 160, 170 may be a personal computing device intended for use by a user, and have all of the components normally used in connection with a personal computing device such as a processor 262, memory (e.g., RAM and internal hard drives) storing data 263 and instructions 264, a display 265, and user input 266. The client computing device may also include a camera 267 for recording video streams and/or capturing images, speakers, a network interface device, and all of the components used for connecting these elements to one another. The client computing device 160 may also include a location determination system, such as a GPS 268. Other examples of location determination systems may determine location based on wireless access signal strength, images of geographic objects such as landmarks, semantic indicators such as light or noise level, etc.

Although the client computing devices 160, 170 may each comprise a full-sized personal computing device, they may alternatively comprise mobile computing devices capable of wirelessly exchanging data with a server over a network such as the Internet. By way of example only, client computing device 160 may be a mobile phone or a device such as a wireless-enabled PDA, a tablet PC, a netbook, a smart watch, a head-mounted computing system, or any other device that is capable of obtaining information via the Internet. As an example the user may input information using a small keyboard, a keypad, microphone, using visual signals with a camera, or a touch screen.

As with memory 230, storage system 140 can be of any type of computerized storage capable of storing information accessible by the server computing devices 110, such as a hard-drive, memory card, ROM, RAM, DVD, CD-ROM, write-capable, and read-only memories. In addition, storage system 140 may include a distributed storage system where data is stored on a plurality of different storage devices which may be physically located at the same or different geographic locations. Storage system 140 may be connected to the computing devices via the network 150 as shown in FIG. 1 and/or may be directly connected to any of the computing devices 110.

Storage system 140 may store data, such images and other information corresponding to particular entities.

The one or more processors 220 may identify and select one or more client devices from the general population to serve as ambassadors for the entity 105. For example, the one or more processors 220 may identify and select devices automatically based on location information associated with the devices. Protections will be put in place to ensure that user privacy remains protected. For example, users may be required to specifically authorize location reporting to be considered as possible candidates to become an ambassador. Moreover, in some example, the users may be required to download a particular application or other software, and agree to the terms of use, in addition to enabling location reporting. Users will be provided with the option to add or remove their devices from consideration for service as ambassadors at any time by, for example, setting a location reporting mode on the device to "off." Additional provisions are made for further protecting privacy and security. For example, additional provisions include anonymization of personally identifiable information, aggregation of data, filtering of personal information, encryption, hashing or filtering of personal information to remove personal attributes, time limitations on storage of information, or limitations on data use or sharing. In addition to or instead of these automated privacy and security measures, in some embodiments, some or all of the requests may be reviewed manually.

Once a device has been selected for service as an ambassador, a request to serve as an ambassador for a particular entity may be sent by the one or more processors to the device for approval by the user. Upon accepting the request, the user may serve as an unverified ambassador. In some instances, verification of the user may be requested by the user or the one or more processors, such that the user, if verified, may have broader authority to respond to requests on behalf of the entity. In such an example, the user or the one or more processors may send a verification request to an owner of the entity 105. The ambassador device may be required to approve the information included in the verification request. In some examples, the ambassador may be given the option to edit, add, or remove any information included in the verification request.

A secure channel may be established between the ambassador devices 161-167 and any of the client devices 170-174 requesting information regarding the particular entity 105. In some examples, data sent over the secure channel may in some instances be encrypted, and access to the secure channel may be limited to users meeting predetermined criteria. The communication channel may be used to connect one user with one ambassador, multiple users with multiple ambassadors for the entity 105, multiple users with multiple ambassadors for multiple entities, or any combination thereof. Additional protections may be implemented to further protect privacy of all users communicating over the channel or otherwise associated with the entity or general public. For example, requests to the ambassadors may be automatically or manually screened, such that requests for personal information or otherwise inappropriate requests are filtered. In some instances, users submitting one or multiple inappropriate requests may be blocked from further usage.

Figure 3:
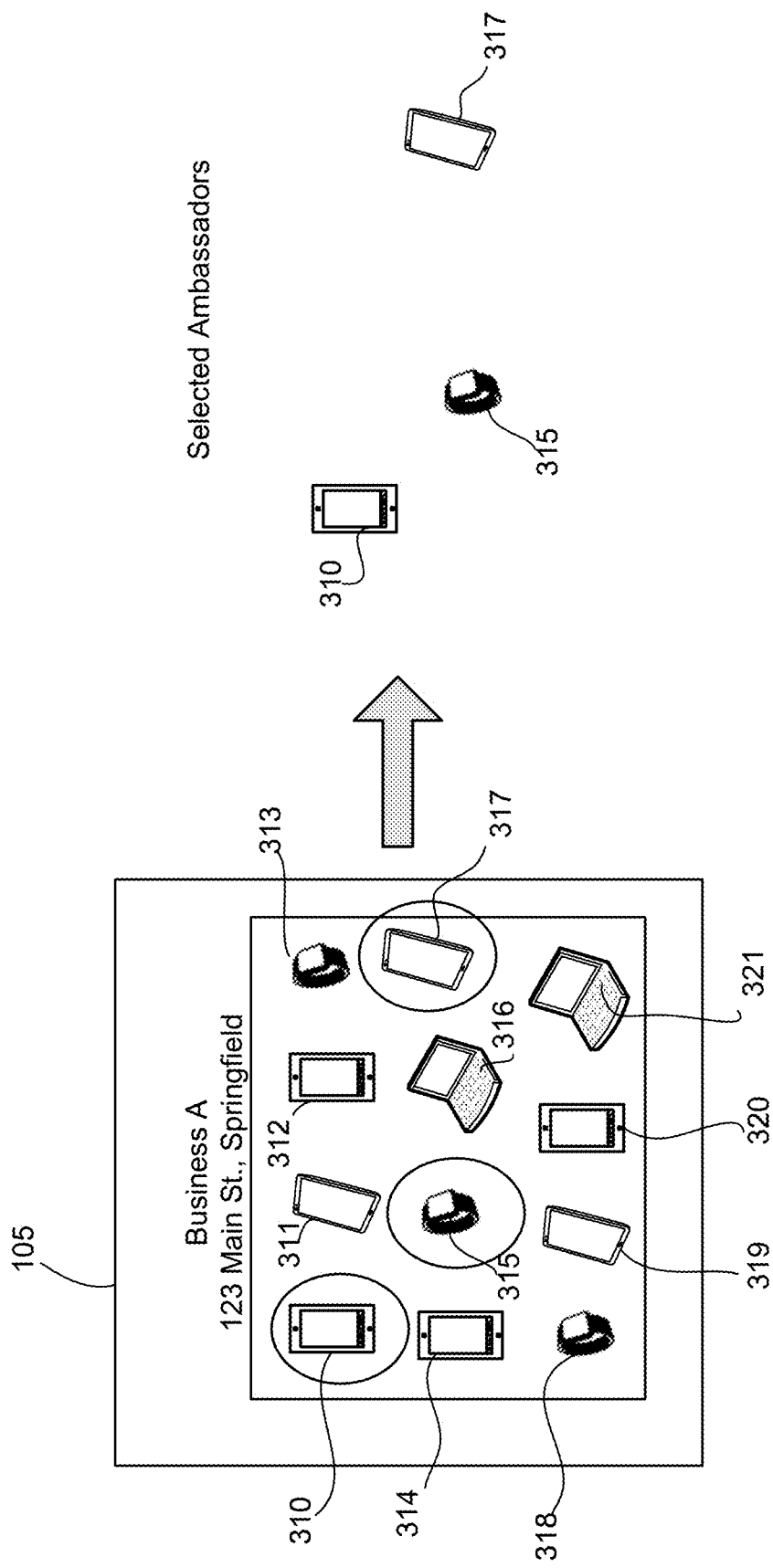
FIG. 3 illustrates an example of selecting ambassador devices according to aspects of the disclosure.

FIG. 3 illustrates an example of selecting candidate devices to serve as ambassadors for a particular entity 105. The entity 105 corresponds to a particular geographic location, such as a physical address or geographic coordinates where the entity 105 maintains a storefront, headquarters, warehouse, etc. A plurality of devices 310-321, each authorizing location reporting, may each report locations in a vicinity of the particular geographic location corresponding to the entity 105. For example, each of the plurality of devices 310-321 may have reported at least one location within a predetermined distance of the particular geographic location within a given time period. Of these candidate devices, however, only some may be selected as ambassadors. For example, selection may be based on frequency of visits to the particular geographic location and/or an amount of time spent at the particular geographic location during one or more visits. By way of example only, if the entity 105 is a coffee shop, the device 314 may have visited the coffee shop once for approximately 20 minutes, while the device 315 may visit the coffee shop four days per week for approximately three hours each visit. In this example, the device 315 is more likely to be selected as an ambassador, as a user of the device 315 is more likely to have information regarding the coffee shop than a user of the device 314. Other criteria for selecting ambassadors may include, for example, variation of visit times, variation of device type, or variation of any of a variety of other types of information. Some other mechanisms for selecting ambassadors may include identifying users that have left a review of the entity, uploaded a photo related to the entity, contributed to information posted online regarding the entity, been an active contributor for entities in a given geographical area or entities of a particular type, etc. In the example shown, devices 310, 315, and 317 are selected to serve as ambassadors for the entity 105.

Figure 4:
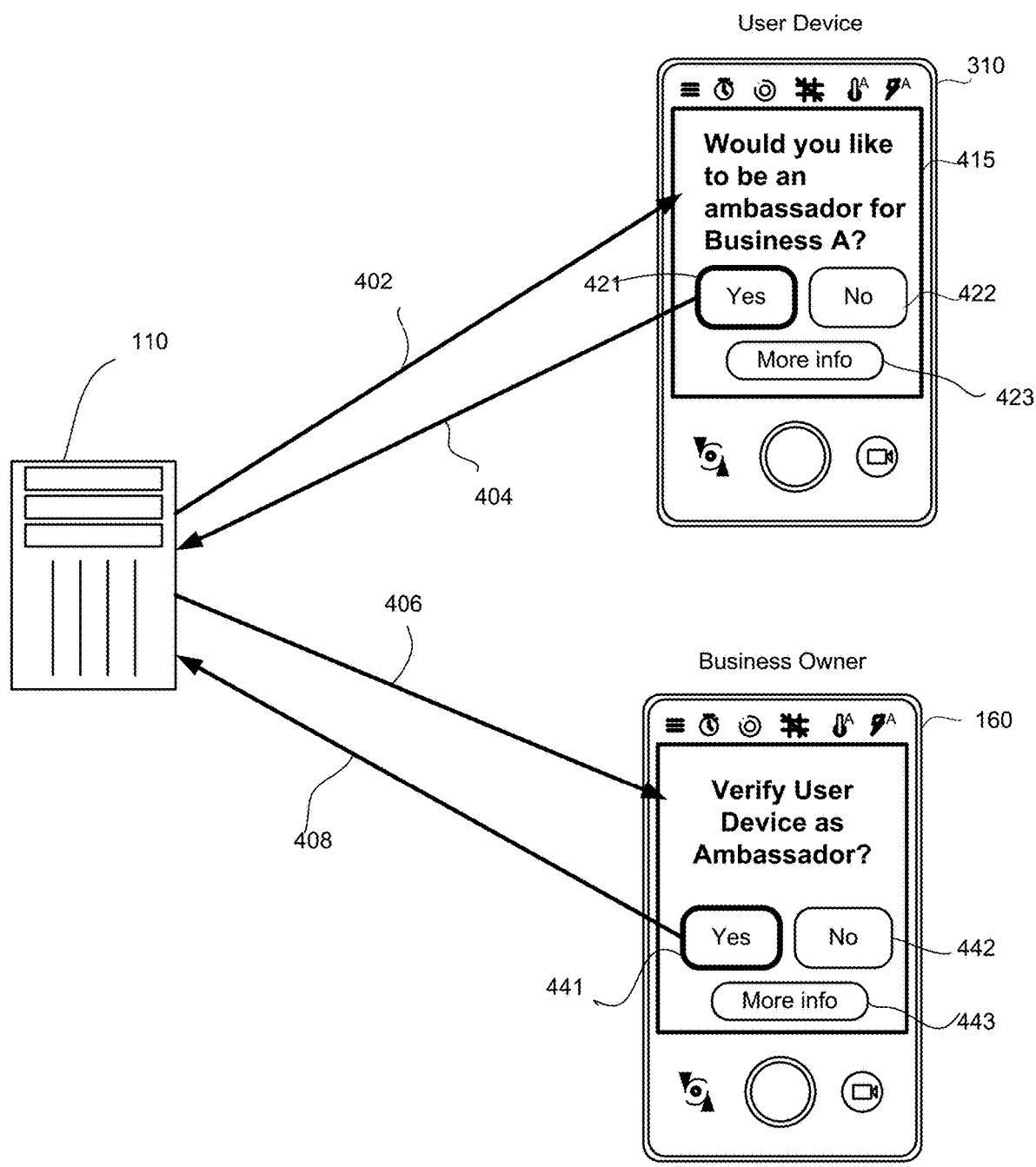
FIG. 4 illustrates an example of verifying an ambassador device according to aspects of the disclosure.

FIG. 4 illustrates example communications between the one or more processors 110 and selected ambassador device 310, and between the one or more processors 110 and device 160 belonging to an owner of the particular entity. The one or more processors 110 sends a first request 402 to the selected user device 310, for example, asking whether a user of the device 310 would like to be an ambassador for Business A. According to some examples, the device 310 may include an interface which relays the first request 402 to the user, such as by presenting the first request as text on a display 415. It should be understood that the interface illustrated in FIG. 4 is merely an example, and that any of a variety of types of interfaces is possible.

The user of the device 310 may send a first response 404 back to the one or more processors 110, for example through the interface. For example, the interface may include one or more response buttons 421, 422 for efficiently responding to the first request. In other examples, responses may be entered through other mechanisms, such as by typing, voice commands, etc. In this example, an option for the user to view more information regarding serving as an ambassador for the Business A is presented as information button 423. Such additional information may include, for example, an explanation of why the device 310 was selected, an explanation of requirements for serving as an ambassador, information regarding the Business A, or any other information.

If the user of the device 310 agrees to serve as an ambassador, in some examples a second request 406 may be sent from the one or more processors 110 to device 160 belonging to the owner of Business A. The second request 406 may ask whether the entity owner will verify the user device 310 as an ambassador. The second request may include, for example, additional information, such as information related to the device 310, why the device 310 was selected, an operator of the device 310, or any other information. Such information may be accessed by the entity owner by, for example, selecting interface button 443. Other options for responding through the interface may include, for example, response buttons 441, 442. Similar to the interface presented on the device 310, it should be understood that many variations of the interface and the input of responses are possible.

The entity owner may send a second response 408 indicating whether the device 310 is verified. If the device 310 is not verified, the device 310 may still be authorized to serve as an ambassador for the Business A. However, the types of requests for which the device 310 may be limited if the device 310 is not verified, whereas verified devices may have broader access to view requests from users of the general population. The verified devices may additionally or alternatively have broader authority to respond to requests without oversight from the entity owner or another entity.

Once a user of a selected client device agrees to serve as an ambassador, the selected client device may provide information regarding the particular entity to an information site, such as a search engine results page associated with the particular entity, or directly to user devices in the general public. In either case, the entity owner may be able to oversee the communications sent on behalf of the particular entity, and in some instances edit the communications before they are sent. Further, the entity owner may receive a report of the requests received over the communication channel and the responses provided. Such report may guide the entity owner as to what types of information to add to its website or other marketing materials.

Figure 5:
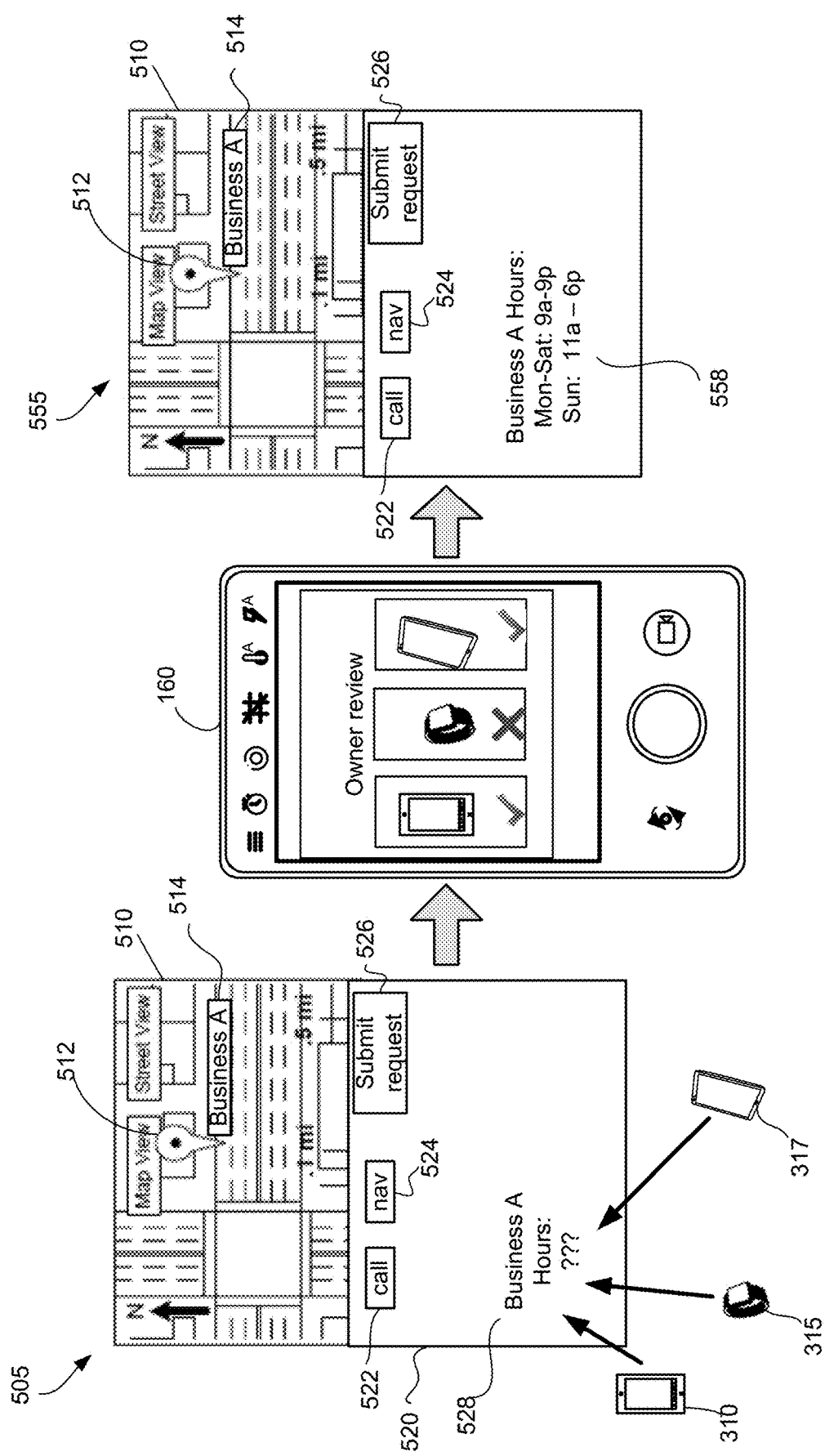
FIG. 5 illustrates an example communication between ambassador devices and a publicly available information page according to aspects of the disclosure.

FIG. 5 illustrates an example of ambassador devices submitting information to an entity, such as an information site. For example, search engine results listing 505 includes a map section 510 and an informational section 520. The listing 505 may be displayed, for example on a client device, in response to a request for information related to Business A. The request for information may include, for example, an address, entity name, general geographical area, type of entity, etc.

The map section 510 may include a depiction of geographical objects at a particular geographic location. For example, the geographic objects may include roads, buildings, landmarks, statues, street signs, etc. The objects may be depicted in, for example, a roadgraph, aerial imagery, street level imagery, or the like. The map section 510 may also depict a marker 512 corresponding to a requested location, such as Business A. The marker 512 identifies where the requested location is located with respect to other objects depicted in the map section. The marker 512 may be depicted in any of a variety of shapes and forms. Further, a label 514 may identify that the marker 512 corresponds to Business A.

Informational section 520 provides further information related to the Business A. Such information may include user input controls 522, 524, 526, enabling the user to take a predetermined action. The predetermined action may be, for example, calling a phone number for the Business A, requesting navigational information to the Business A, or submitting a request to the Business A. Examples of such requests may be questions related to hours of operation, questions related to price or availability of products or services, requests to reserve a product or service, or any other types of requests. Such requests may be sent to one or more of the ambassador devices 310, 315, 317, which may provide a response. The response may be provided directly to the requestor, displayed in the informational section 520 or elsewhere in the listing 505, or both.

The informational section 520 may also include text 528, such as a listing of the operating hours of the Business A. In the example of FIG. 5, the text information 528 is incomplete, as the hours of operation are not listed. Accordingly, the ambassador devices 310, 315, 317 may provide responses including the missing information. The ambassador devices 310, 315, 317 may be verified or unverified.

According to some examples, the information supplied by the ambassador devices may be automatically detected by the ambassador devices. For example, information regarding the operating hours of the entity may be determined based on times when ambassador devices appear at the location and disappear from the location.

Prior to the responses being used to generate an updated listing 555, the entity owner for the Business A may review the submitted responses. For example, the responses may be sent to the user device 160 belonging to the entity owner, either individually or as a batch. The owner may review the submitted responses, and approve, reject, edit, or otherwise manipulate the information. For example, as shown in FIG. 5, the owner may approve the responses from the devices 310, 317, but reject the response from the device 315. This may be because the response from the device 315 is incorrect, incomplete, or otherwise inaccurate. The responses from the devices 310, 317, however, may be wholly or partly accurate and therefore approved. By way of example only, the device 310 may submit the operating hours for the entity A for Monday through Saturday, while the device 317 submits the operating hours for the Business A for Sundays. Such information is shown in text 558 for the updated listing 555. However, it should be understood that the submitted information may be shown anywhere in the listing 555, or in any form (e.g., text, graphs, charts, ratings, etc.) in any type of information site or application. While in the examples described above the submitted information is approved before updating the information site, in other examples the submitted information may be approved afterwards, and the updated site may be updated again if needed.

In other examples, only verified devices may be permitted to submit information to update the information site, or unverified submissions may be automatically rejected. The permissions for the verified devices as compared to the unverified devices may depend on a type of information submitted, a destination for the submitted information, or any other parameters. For example, verified devices may be permitted to submit information such as operating hours, while unverified devices may be permitted to submit information such as a current wait time at the entity. While FIG. 5 shows the information as being provided to a search result listing, in other examples the information may be provided to other applications, such as scheduling applications, ride-service applications, games, or any of a variety of other applications.

Figure 6:
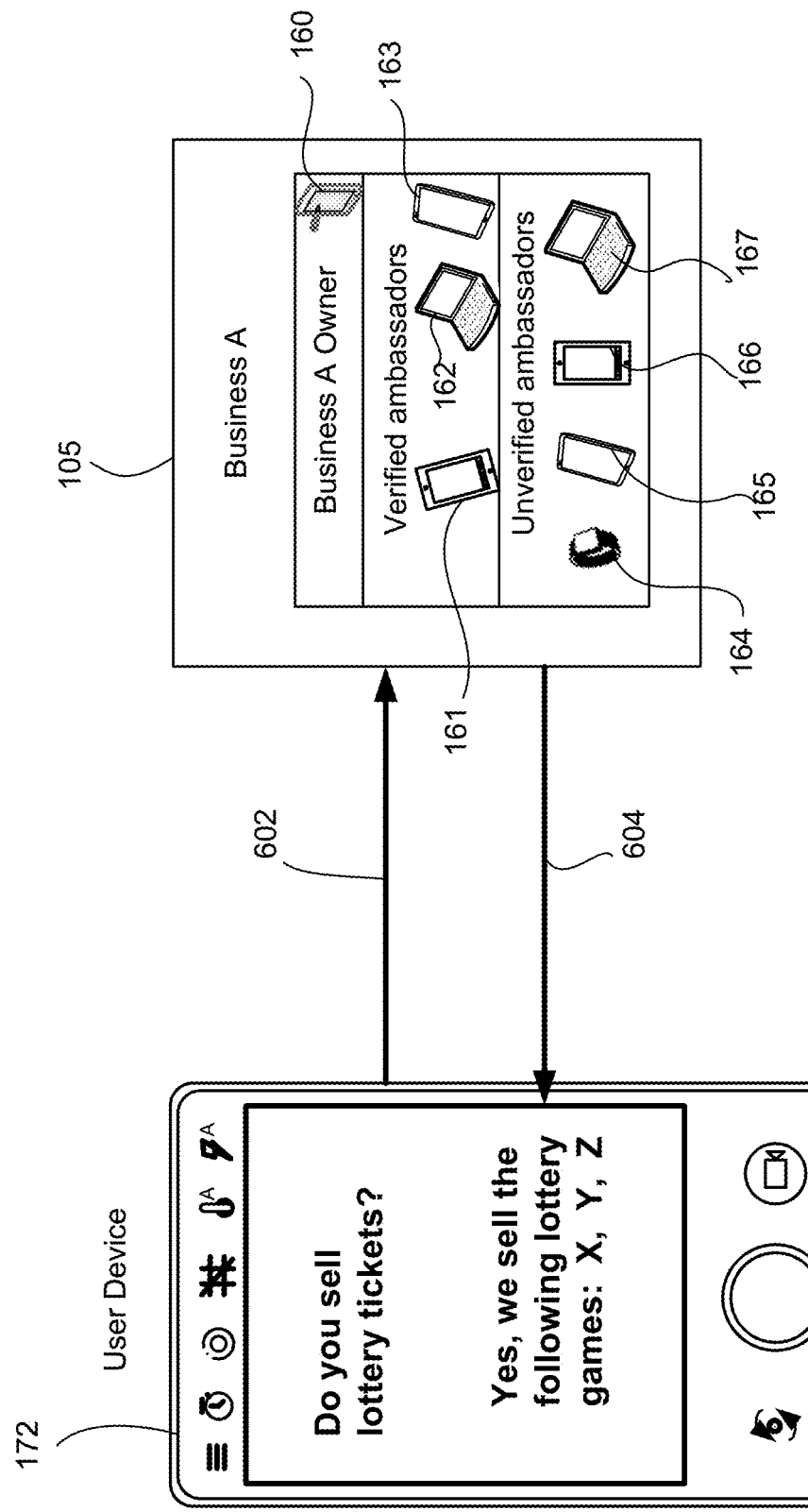
FIG. 6 illustrates an example communication between a user device and ambassador devices for a particular entity according to aspects of the disclosure.

FIG. 6 illustrates another example, where requests are received from user devices in the general public, and responses are provided by one or more ambassador devices directly to the user device. In this example, user device 172 submits a request 602, such as "Do you sell lottery tickets?" to the entity 105. The request may be received by one or more selected ambassador devices, categories of ambassador devices (e.g., verified or unverified), or all the ambassador devices 161-167. For example, the request 602 may be automatically parsed at a server to determine which ambassador devices should receive the request. The determination may include, for example, identifying particular keywords or key phrases in the request, and identifying particular ambassador devices designated to receive requests including the identified keywords or key phrases. As another example, ambassadors may be selected to receive the request based on other information, such as a current location of the ambassador devices. For example, if the request seeks a current wait time at the entity, an ambassador device currently at the entity may be selected to receive the request. In some examples, the request may be received by all the ambassadors 161-167 for a particular entity simultaneously. In other examples, the requests may be sent to a selected subset of the ambassadors for a particular entity. For example, a round-robin type algorithm may be used to rotate across which ambassadors receive requests to keep a balance, or ambassadors with faster response rates may be prioritized.

Any one of the ambassador devices 161-167 may send a response 604 on behalf of the entity. For example, the response 604 may be "Yes, we sell lottery tickets" or the response 604 may specify for which lottery games the entity 105 sells tickets. According to some examples, once a first ambassador device sends the response 604, the remaining ambassador devices may be notified that the request 602 has been answered. By way of example only, an interface on the ambassador devices prompting a response may disappear. According to some examples, if the response 604 is provided by an unverified ambassador 164-167, the response may be reviewed and approved by a verified ambassador 161-163 prior to transmission to the client device 172. The verified ambassador may have been approved by an owner of the entity. The unverified ambassador may be self-elected based on the ambassador's own actions.

According to some examples, the information supplied by the ambassador devices may be automatically detected by the ambassador devices. For example, detection of products available may be performed based on detection of RFID tags, or detection of whether a restaurant is serving lunch or dinner may be determined based on a detected level of lighting at the restaurant. In other examples, automatically detected information may include information about current network or environmental conditions. In some examples, ambassador devices may provide responses to enquiries relating to such information automatically, optionally without engaging the ambassador.

While only one entity 105 is illustrated in the example of FIG. 6, in other examples the user device 172 may communicate a request to multiple entity at a given time. For example, the request 602 may be transmitted to ambassadors for a plurality of different entities within a predetermined geographic area or distance from the client device 172. In this regard, the client device 172 may receive multiple responses, which a user of the client device 172 can compare. For example, a response sent on behalf of an ambassador for each entity may be presented on the client device 172 along with information associated with that entity, such as the entity name, address, phone number, etc.

The entity owner for each entity may receive reports related to the information sent over the communication channel. For example, the report may identify each of the requests received, indicating what was requested, a date and time of the request, a frequency of repetition of the request, or a plethora of other information. For example, such other information may include a response time for each ambassador, an identification of highest ranked contributors, information that identifies a particularly effective unverified ambassador, etc. However, to maintain privacy, information related to the client devices from which requests were received, or users of such client devices, is omitted from the report or anonymized. The information in the report may provide the entity owner with an opportunity to understand the types of information that customers are seeking, and to adapt the entity or advertising for the entity to accommodate such requests.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
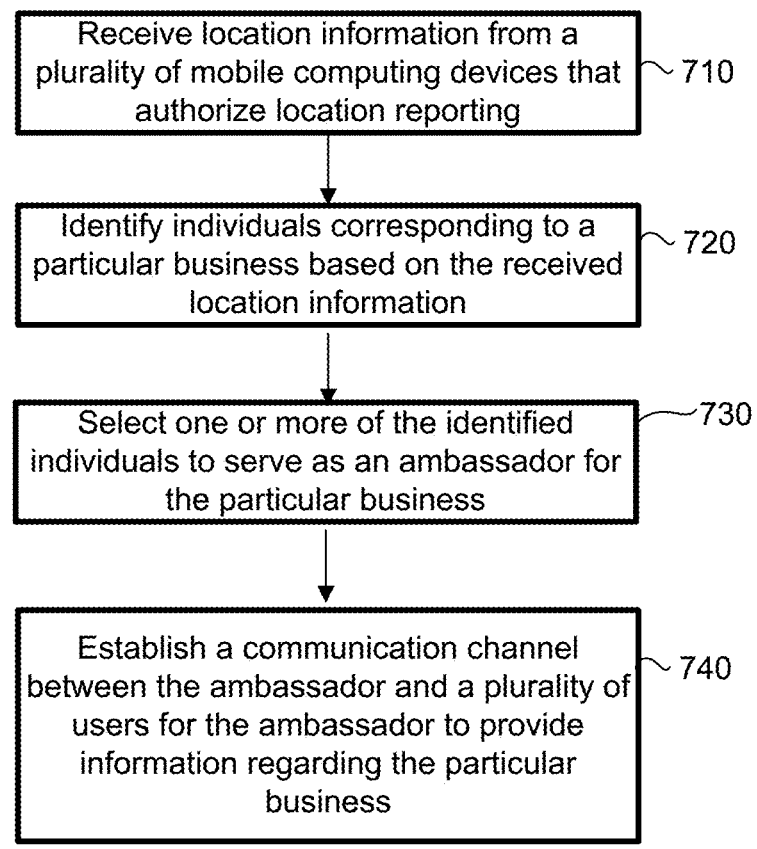
FIG. 7 is a flow diagram illustrating an example method according to aspects of the disclosure.

FIG. 7 illustrates an example method 700 of establishing a communication channel between at least one user and at least one entity using ambassadors. The method may be performed by, for example, a remote server or other computing device. The method may or may not be initiated by a request for information about an entity from a user.

In block 710, location information is received from a plurality of mobile computing devices that authorize location reporting. For example, mobile devices may be set to provide their location, and thereby be considered as potential candidates to serve as ambassadors. The setting may be changed by the user at any time. In other examples, the user may download an application to the mobile device for serving as a entity ambassador. The application may ask the user to agree, such as through a terms of service agreement, that location reporting is authorized.

In block 720, individuals are identified, wherein the individuals correspond to a particular entity. The individuals may be identified based on the received location information. For example, if a mobile device visited the particular entity one or more times within a predetermined time period, the mobile device may be identified as a potential candidate for serving as an ambassador. Alternatively or additionally, potential candidates for serving as an ambassador may be identified based on current location information. The individuals need not be existing employees or have other preexisting relationships with the entity to be identified as a candidate ambassador.

In block 730, one or more of the identified individuals are selected to serve as an ambassador for the particular entity. For example, the individuals may be selected based on any of a variety of criteria, such as amount of time spent at the entity, number or frequency of visits to the entity, randomly, etc. The selected individuals may receive a request to serve as an ambassador, which they can accept through the mobile device. Some ambassadors may be verified by an owner of the entity. Such verified ambassadors may be able to perform a wider range of activities on behalf of the entity.

In block 740, a communication channel is established between the selected ambassadors and a plurality of users, such as users in the general public. The users and ambassadors may exchange information regarding the entity over the communication channel. For example, the users may request information regarding the entity, such as product or service price or availability, or requests to reserve a product or service. Users may also request technical information identifiable by the mobile communication devices associated with the ambassadors, such as current environmental or network conditions. For example, a user may wish to know whether an entity provides a Wi-Fi connection or may wish to know the temperature in the vicinity of the entity. The ambassadors may provide responses on behalf of the entity, thereby reducing a burden on the entity owner and reducing a likely delay in response time. Responses may be provided through the action of the individuals serving as ambassadors or automatically by the mobile communication devices associated with the ambassadors. Any number of ambassadors may be selected for a particular entity, and the number of ambassadors may be determined by the entity owner. As the number of ambassadors selected increases, and the number of ambassadors who will likely see a request and be able to quickly respond therefore increases, a response time for each request likely decreases. The communication channel may be a secure channel, where access to the channel is limited to authorized or registered users.

The foregoing examples are advantageous at least in that they provide a mechanism for user to quickly receive and compare types of information that may not be available on a typical website. Moreover, the techniques described herein provide for communication with a entity that does not have a website. Using such techniques, information regarding a entity can be updated frequently, thereby providing for an improved user experience.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method, method comprising:
   receiving a request from a client device for information relating to an entity;
   receiving information from a plurality of mobile communication devices, wherein each of the mobile computing devices have been set to authorize reporting of information;
   identifying, based on the received information, one or more mobile communication devices;
   selecting one of the identified one or more mobile communication devices;
   transmitting a request to the selected one of the identified one or more mobile communication devices to serve as an ambassador for the entity;
   receiving, by one or more processors, confirmation from the selected one of the identified one or more communication devices; and
   enabling communication by the selected one of the one or more communication devices on behalf of the entity.

2. The method of claim 1, further comprising verifying the selected mobile communication device as an ambassador for the entity.

3. The method of claim 2, wherein verifying the selected mobile communication device comprises receiving authorization from an owner of the entity for the selected mobile communication device to communicate on behalf of the entity.

4. The method of claim 1, further comprising establishing a communication channel between the client device and the selected one of the one or more communication devices.

5. The method of claim 4, further comprising providing access to the communication channel to the owner of the entity.

6. The method of claim 5, further comprising enabling the owner to correct information provided over the communication channel.

7. The method of claim 1, wherein selecting the one of the one or more mobile communication devices is at least partly based on device settings configured by a user of the selected mobile device enabling the selected mobile device to be considered for selection.

8. The method of claim 1, wherein the information regarding the entity is automatically detected by the one or more mobile communication devices.

9. A system, comprising:
memory; and
one or more processors in communication with the memory, the one or more processors configured to:
receive a request from a client device for information relating to an entity;
receive information from a plurality of mobile communication devices, wherein each of the mobile computing devices have been set to authorize reporting of information;
identify, based on the received information, one or more mobile communication devices;
select one of the identified one or more mobile communication devices;
transmit a request to the selected one of the identified one or more mobile communication devices to serve as an ambassador for the entity;
receive confirmation from the selected one of the identified one or more communication devices; and
enable communication by the selected one of the one or more communication devices on behalf of the entity.

10. The system of claim 9, further comprising verifying the selected mobile communication device as an ambassador for the entity.

11. The system of claim 10, wherein verifying the selected mobile communication device comprises receiving authorization from an owner of the entity for the selected mobile communication device to communicate on behalf of the entity.

12. The system of claim 9, further comprising establishing a communication channel between the client device and the selected one of the one or more communication devices.

13. The system of claim 12, further comprising providing access to the communication channel to the owner of the entity.

14. The system of claim 13, further comprising enabling the owner to correct information provided over the communication channel.

15. The system of claim 9, wherein selecting the one of the one or more mobile communication devices is at least partly based on device settings configured by a user of the selected mobile device enabling the selected mobile device to be considered for selection.

16. The system of claim 9, wherein the information regarding the entity is automatically detected by the one or more mobile communication devices.

17. A non-transitory computer-readable medium storing instructions executable by one or more processors for performing a method, comprising:
receiving a request from a client device for information relating to an entity;
receiving information from a plurality of mobile communication devices, wherein each of the mobile computing devices have been set to authorize reporting of information;
identifying, based on the received information, one or more mobile communication devices;
selecting one of the identified one or more mobile communication devices;
transmitting a request to the selected one of the identified one or more mobile communication devices to serve as an ambassador for the entity;
receiving confirmation from the selected one of the identified one or more communication devices; and
enabling communication by the selected one of the one or more communication devices on behalf of the entity.

18. The method of claim 17, further comprising verifying the selected mobile communication device as an ambassador for the entity.

19. The method of claim 18, wherein verifying the selected mobile communication device comprises receiving authorization from an owner of the entity for the selected mobile communication device to communicate on behalf of the entity.

20. The method of claim 17, further comprising establishing a communication channel between the client device and the selected one of the one or more communication devices.

* * * * *

UNITED STATES PATENT AND TRADEMARK OFFICE
CERTIFICATE OF CORRECTION

| | |
|---|---|
| PATENT NO. | : 11,751,010 B2 |
| APPLICATION NO. | : 18/069652 |
| DATED | : September 5, 2023 |
| INVENTOR(S) | : Matteo Agosti and Ankit Gupta |

It is certified that error appears in the above-identified patent and that said Letters Patent is hereby corrected as shown below:

On the Title Page

Under (*) Notice, please insert the following: -- This patent is subject to a terminal disclaimer. --

Signed and Sealed this
Twenty-sixth Day of December, 2023

Katherine Kelly Vidal
*Director of the United States Patent and Trademark Office*